United States Patent [19]

Oleszczuk et al.

[11] Patent Number: 5,616,408
[45] Date of Patent: Apr. 1, 1997

[54] MELTBLOWN POLYETHYLENE FABRICS AND PROCESSES OF MAKING SAME

[75] Inventors: Andrew R. Oleszczuk, Simpsonville, S.C.; Scott L. Gessner, Encinitas, Calif.

[73] Assignee: Fiberweb North America, Inc., Simpsonville, S.C.

[21] Appl. No.: 577,900

[22] Filed: Dec. 22, 1995

[51] Int. Cl.$^6$ .................................................. B32B 27/00
[52] U.S. Cl. .................. 442/346; 156/306.6; 156/308.2; 264/176.1; 428/903; 525/240; 442/347; 442/400
[58] Field of Search ...................................... 525/177, 184, 525/240; 428/224, 288, 284, 286, 297, 298, 198, 903, 300, 296; 264/176.1; 156/306.6, 308.2

[56] References Cited

U.S. PATENT DOCUMENTS

| | | | |
|---|---|---|---|
| 3,537,967 | 11/1970 | Kelley et al. | 204/159.18 |
| 4,274,932 | 6/1981 | Williams et al. | 204/159.2 |
| 4,436,780 | 3/1984 | Hotchkiss et al. | 428/198 |
| 4,467,065 | 8/1984 | Williams et al. | 524/296 |
| 4,555,811 | 12/1985 | Shimalla | 2/51 |
| 4,563,259 | 1/1986 | Rayner | 524/99 |
| 4,632,861 | 12/1986 | Vassilatos | 428/296 |
| 4,634,739 | 1/1987 | Vassilatos | 525/240 |
| 4,663,220 | 5/1987 | Wisneski et al. | 428/221 |
| 4,749,734 | 6/1988 | Williams et al. | 524/102 |
| 4,806,598 | 2/1989 | Mormon | 525/63 |
| 4,820,755 | 4/1989 | Webster | 524/88 |
| 4,822,678 | 4/1989 | Brody et al. | 428/373 |
| 4,839,228 | 6/1989 | Jezic et al. | 428/401 |
| 4,874,666 | 10/1989 | Kubo et al. | 428/398 |
| 4,908,163 | 3/1990 | McAmish et al. | 264/12 |
| 4,950,549 | 8/1990 | Rolando et al. | 428/500 |
| 5,140,073 | 8/1992 | Rolando et al. | 525/240 |
| 5,188,885 | 2/1993 | Timmons et al. | 428/198 |
| 5,236,963 | 8/1993 | Jacoby et al. | 521/92 |
| 5,446,100 | 8/1995 | Durrance | 428/198 |
| 5,547,746 | 8/1996 | Burton | 428/288 |

Primary Examiner—James J. Bell
Attorney, Agent, or Firm—Bell, Seltzer, Park & Gibson, P.A.

[57] ABSTRACT

A nonwoven web of meltblown microfibers formed of a composition of polyethylene and at least one component added to provide processing stability to the polyethylene component. The meltblown web can be produced at high polymer throughputs and exhibits good barrier properties. The meltblown web is useful as a component of a composite fabric, which can be used for barrier application in medical and industrial applications.

24 Claims, 1 Drawing Sheet

MELTBLOWN POLYETHYLENE FABRICS AND PROCESSES OF MAKING SAME

FIELD OF THE INVENTION

The invention relates to nonwoven fabrics and to processes for producing nonwoven fabrics. More specifically, the invention relates to nonwoven fabrics having barrier properties which are particularly suited for medical applications.

BACKGROUND OF THE INVENTION

Nonwoven fabrics and fabric laminates are widely used in a variety of applications, for example, as components of absorbent products such as disposable diapers, adult incontinence pads, and sanitary napkins; in medical applications such as surgical gowns, surgical drapes, sterilization wraps, and surgical face masks; and in other numerous applications such as disposable wipes, industrial garments, house wrap, carpets and filtration media. For example, nonwoven barrier fabrics have been developed which impede the passage of bacteria and other contaminants and which are used for disposable medical fabrics, such as sterilization wraps for surgical and other health care related instruments, surgical drapes, disposable gowns and the like.

Barrier fabrics can be formed by sandwiching an inner fibrous web of thermoplastic meltblown microfibers between two outer nonwoven webs of substantially continuous thermoplastic spunbonded filaments. The fibrous meltblown web provides a barrier impervious to bacteria or other contaminants in the composite nonwoven fabric, and the spunbonded webs provide abrasion resistance and integrity to the laminate. Examples of such trilaminate nonwoven fabrics are described in U.S. Pat. No. 4,041,203 and U.S. Pat. No. 4,863,785.

Current industry standards require that laminate fabrics used for barrier purposes provide a predetermined level of protection against penetration of the fabric by air borne contaminants. The level of barrier protection required can depend upon the particular end use application of the fabric. Many laminate fabrics currently available cannot meet all of the requirements for a particular end use application.

In addition, conventional trilaminate barrier fabrics can also be limited with regard to the types of sterilization procedures which can be used therewith. For some applications, it is desired that the fabric or garment be sterilized in the final stages of manufacture by exposure to gamma radiation. For example, the fabric or garment may first be sealed in a protective package, and then exposed to gamma radiation to sterilize the package and its contents.

However, sterilization by gamma irradiation has been found to be unsuitable for many of the known medical barrier fabrics. Some of the polymers conventionally used in such medical barrier fabrics, such as conventional grades of polypropylene for example, are especially sensitive to degradation by gamma irradiation. Fabrics produced from such polymers tend to lose strength over time, becoming brittle as a result of the gamma irradiation. Also, the instability of the polymers to the irradiation results in the generation of distasteful odors in the product which are unacceptable to the consumer.

Various attempts have been made to overcome these limitations. For example, efforts have been made to render the polypropylene polymers more stable to gamma irradiation, such as by incorporating certain additives in the polymer to reduce the amount of degradation. For example, U.S. Pat. No. 4,822,666 describes a radiation stabilized polypropylene fabric in which a long-chain aliphatic ester is added to the polymer. U.S. Pat. No. 5,041,483 discloses incorporating a rosin ester into the polypropylene to stabilize the polymer and reduce the tendency toward odor generation after gamma irradiation. However, the use of such additives adds expense to the manufacturing process. Further, polypropylene is difficult to render gamma-stable even with the use of additives or stabilizers.

Other polymers have good stability upon exposure to gamma irradiation, such as polyethylene. However, there are problems associated with the use of polyethylene to form nonwoven webs, specifically as the meltblown component of a trilaminate fabric. For example, polyethylene generally exhibits poor spinnability, particularly at high spinning speeds. Yet high spinning speeds are highly desirable for successful commercial production of polyethylene fibers. Further, it is difficult to produce fine denier fibers at commercially feasible spinning speeds. This is especially true as fiber size decreases to the 1 to 50 micron range useful for imparting to a fabric the degree of barrier protection required by industry standards.

SUMMARY OF THE INVENTION

The present invention provides nonwoven meltblown webs which have excellent barrier properties and are flexible and soft. The meltblown webs of the invention can be used as components in any variety of nonwoven products, and are particularly useful as barrier components in medical fabrics, such as sterile wraps, surgical gowns, and the like. Further, the meltblown fabrics of the invention can be sterilized using gamma irradiation, without loss in strength and the generation of distasteful odors.

The meltblown webs of the invention are formed of a blend or composition which includes polyethylene as the majority component thereof. Preferably the polyethylene is a linear low density polyethylene (LLDPE) having a melt flow rate of at least about 125, or higher.

The blend also includes a polyethylene processing stabilizing component selected to stabilize the processing of the polyethylene resin. Advantageously, the polyethylene processing stabilizing agent is gamma irradiation stable. It is believed that the polyethylene processing stabilizing component acts to "stiffen" the soft, highly elongatable polyethylene resins sufficiently so that the resin can be meltblown without substantial formation of shot, polymer globules, and the like. Further, the polyethylene processing stabilizing agent provides improved web integrity and strength.

The polyethylene can thus be meltblown at commercially desirable polymer throughputs without a corresponding significant increase in fiber size or denier, as determined by the resultant barrier properties of the meltblown web. Preferably, the polyethylene can be meltblown at polymer throughput rates of at least about 0.65 grams of polymer per capillary hole per minute ("g/h/m"), and up to about 1 g/h/m, and higher. In addition, the resultant polyethylene web can have good integrity and increased strength, particularly as compared to 100% polyethylene meltblown webs.

In one embodiment of the invention, the polyethylene processing stabilizing agent is a "stiffening" polymeric component, such as, but not limited to, a polyolefin, polyester, polyamide, and the like. In this embodiment of the invention, preferably the polyethylene processing stabilizing agent is polyester. In this embodiment of the invention, the polyethylene processing stabilizing component preferably is present in the blend in an amount of about 1 to about 15 percent by weight based upon the weight of the polyethylene polymer.

In another embodiment of the invention, the polyethylene processing stabilizing component is an agent which effects a change in the polymeric structure of the polyethylene, such as a polyethylene crosslinking agent. In this embodiment of the invention, the polyethylene processing stabilizing component is preferably present in the blend in an amount between about 0.05 to about 1 percent by weight based on the weight of the polyethylene polymer.

The meltblown webs of the invention exhibit barrier properties, referred to as the "hydrohead" of the web, comparable to barrier properties exhibited by conventional polypropylene meltblown webs. Indeed, because the polyethylene blend is gamma irradiation stable, the resultant polyethylene meltblown webs can exhibit barrier properties superior to polypropylene webs after being treated with gamma irradiation. For example, the webs of the invention typically exhibit a hydrohead of at least about 40 centimeters ("cm") when produced at polymer throughputs approaching 1 g/h/m, and up to about 45 and 50 cm when produced at polymer throughputs of about 0.65 g/h/m. In contrast, although conventional polypropylene meltblown webs can initially exhibit good barrier properties (i.e., an initial hydrohead of 50 to 55 cm), the barrier properties of such webs decrease significantly after exposure to gamma irradiation and storage (i.e., a subsequent hydrohead of about 20 to 25 cm). This limits the shelf life of gamma treated polypropylene webs.

In another aspect of the invention, laminate nonwoven fabrics are provided which include as a component thereof the polyethylene meltblown webs of the invention. An exemplary laminate nonwoven fabric includes the polyethylene meltblown web sandwiched between and bonded to outer nonwoven webs. Preferably, the outer nonwoven webs are also formed of a gamma irradiation stable polymer composition. At least one of the outer nonwoven webs can be a spunbonded web of substantially continuous thermoplastic filaments. The other of the outer nonwoven webs can also be a nonwoven web of spunbonded substantially continuous filaments. Alternatively, the other nonwoven web can be a nonwoven web of staple fibers. All of the layers are preferably thermally bonded together via a plurality of discrete thermal bonds distributed substantially throughout the length and width dimensions of the composite nonwoven fabric. The polyethylene meltblown layer provides good barrier properties, yet also imparts desirable aesthetic properties to the laminate fabric, such as improved flexibility and softness.

Polyethylene meltblown webs of the invention, and laminate fabrics incorporating the same, can be readily manufactured according to another aspect of the invention. The polyethylene meltblown web can be manufactured at commercially feasible polymer throughput rates of at least about 0.65 g/h/m, and higher, by adding a polyethylene processing stabilizing component to the polyethylene resin, as described above.

Processing parameters are selected based upon the physical properties of the components of the blend (i.e., melt flow rate of the polyethylene, the specific polyethylene processing stabilizing agent used and its properties, etc.). Advantageously the melt temperature of the polyethylene composition is increased at least about 10%, or higher, as compared to melt temperatures used in conventional polyethylene fiber production. This provides increases flowability of the polymer. Increasing melt temperature is also advantageous when the polyethylene processing stabilizing component is a polymer additive having a higher viscosity and/or higher melt temperature than the polyethylene component, such as a polyester, or is a crosslinking agent having an activation temperature at or greater than the melt temperature of the polyethylene.

The polyethylene meltblown webs of the invention provide several desirable and yet apparently opposing properties in one fabric. The fabrics of the invention not only provide a barrier to the transmission of bacteria and other contaminants; they also provide desirable aesthetics such as a cloth-like feel and drapeability without the diminishment of the barrier characteristics. The webs of the invention are also gamma irradiation stable. Further, the meltblown webs can be produced at commercially feasible polymer throughput rates without a significant loss in barrier.

BRIEF DESCRIPTION OF THE DRAWINGS

Some of features and advantages of the invention having been stated, others will become apparent from the detailed description which follows, and the accompanying drawings which form a part of the original disclosure of this invention, and in which.

DETAILED DESCRIPTION OF THE INVENTION

The present invention will now be described more fully hereinafter with reference to the accompanying drawings, in which illustrative embodiments of the invention are shown. This invention may, however, be embodied in many different forms and should not be construed as limited to the embodiments set forth herein. Rather, this embodiment is provided so that the disclosure will be thorough and complete, and will fully convey the scope of the invention to those skilled in the art. Like numbers refer to like elements throughout. For purposes of clarity, the scale has been exaggerated.

Figure 1:
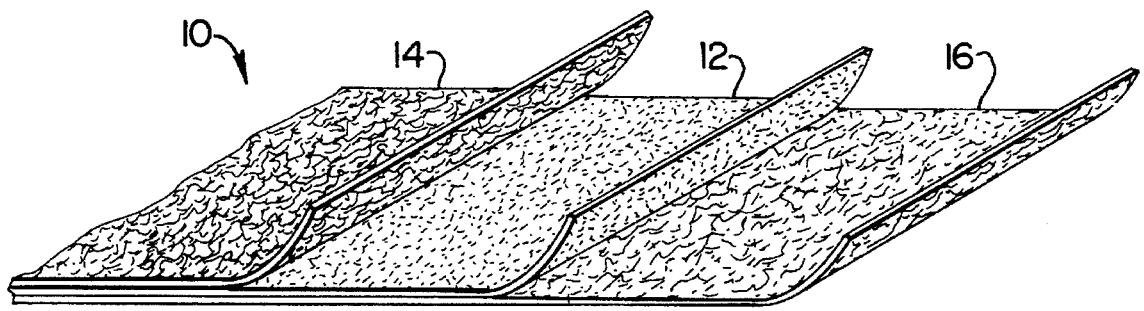
FIG. 1 is a schematic perspective view showing a composite nonwoven fabric laminate including as a component a meltblown web in accordance with the present invention with the respective layers of the fabric being exposed for clarity of illustration.

FIG. 1 is a fragmentary top view of a laminate fabric incorporating as a component thereof a meltblown polyethylene web of the present invention. The laminate is designated generally as 10. Laminate fabric 10 is partially cut away to illustrate the individual components thereof. The fabric is a three ply composite comprising an inner ply 12 sandwiched between outer plies 14 and 16. The composite fabric 10 has good strength, flexibility and drape and may be formed into various articles or garments such as sterile wraps, surgical gowns, surgical drapes and the like. The barrier properties of the fabric 10 make it particularly suitable for medical applications, but the fabric is also useful for any other application where barrier properties would be desirable, such as industrial garments, filtration media, and disposable wipes.

Inner ply 12 is a nonwoven fibrous web comprising a plurality of meltblown thermoplastic microfibers 18. The microfibers preferably have an average fiber diameter of up to about 10 microns with very few, if any, of the fibers exceeding 10 microns in diameter. Usually the average diameter of the fibers will range from 1 to 6 microns. The meltblown microfibrous layer 12 is preferably manufactured in accordance with the process described in Buntin et al U.S. Pat. No. 3,978,185, with modifications thereto as described in more detail below. The meltblown layer 12 may suitably have a basis weight in the range of about 10 to 80 gsm, and preferably in the range of about 10 to 30 gsm.

The thermoplastic polymer used to form the microfibers of meltblown layer 12 is selected for its stability to gamma irradiation. Specifically, the polymer is a blend or composition which includes polyethylene as the majority component thereof. The term "polyethylene" is used in a general sense, and is intended to include various homopolymers, copolymers, and terpolymers of ethylene, including low density polyethylene, low density polyethylene, linear low density polyethylene, with linear low density polyethylene (LLDPE) being the most preferred.

LLDPE can be produced form any of the well-known processes. LLDPE is typically produced by a catalytic solution or fluidized bed process under conditions known in the art. Zieglar-Natta or single site metallocene catalyst systems have been used to produce LLDPE. The resulting polymers are characterized by an essentially linear backbone. Various alpha-olefins are typically copolymerized with ethylene in producing LLDPE. The alpha-olefins, which preferably have 4 to 8 carbon atoms, are present in the polymer in an amount up to about 10% by weight. The most typical comonomers are butene, hexene, 4-methyl-1-pentene, and octene.

Various properties of LLDPE, such as density and melt flow rate, can be controlled by the level of comonomer incorporation into the otherwise linear polymer backbone. Density ranges for LLDPE are relatively broad, typically from 0.87 to 0.95 g/cc (ASTM D-792).

Melt flow rate ranges are also relatively broad and can range from about 0.1 to about 150 g/10 min. The polymer selected preferably has a relatively high melt flow rate, as compared to conventional polymers used in meltblowing processes, as explained in more detail below. Preferred melt flow rates are at least about 125, more preferably at least about 150, or higher, although polymers having lower melt flow rates can be used. The higher melt flow rates are advantageous because of the increased flowability of such polymers, which can assist in increasing polymer throughputs. The MFR is determined according to ASTM test procedure D-1238 and refers to the amount of polymer (in grams) which can be extruded through an orifice of a prescribed diameter under a mass of 2.16 kg at 230° C. in 10 minutes. The MFR values as used herein have units of g/10 min. or dg/min.

Examples of suitable commercially available LLDPE polymers include those available from Dow Chemical Company such as the ASPUN polymers; the EXACT Series of polymers available from the Exxon Chemical Company; and the Affinity polymers available from the Dow Chemical Company. An exemplary LLDPE polymer is ASPUN Type 6831A (150 MFR) from Dow Chemical Company.

Polyethylene resins typically exhibit high elongation and excellent softness due at least in part to low melt strength, which make their use as a minor component of a polymer blend desirable in the production of nonwoven webs. However, prior attempts to process polyethylene resins, either as a sole or majority component, including prior meltblowing attempts, have met with limited success. Polyethylene cannot be readily processed, particularly at high polymer throughput rates required for commercial feasibility and economies of manufacture. Further, fine denier fibers can be difficult to produce, and problems can be associated even with the low speed production of large denier polyethylene fibers, such as polymer breaks, the formation of shot (i.e., formation of large globules of resin in a web), low strength webs, and the like.

The inventors have found that polyethylene can be meltblown quite effectively at relatively high throughputs by blending a polyethylene resin with at least one polyethylene processing stabilizing agent or component. Preferably, the polyethylene processing stabilizing agent is stable to gamma irradiation. The polyethylene processing stabilizing agent is selected to stabilize the processing of the polyethylene resin so that the blend can be meltblown at high polymer throughputs to produce fine denier polyethylene-based fibers, i.e., 1 to 50 micron microfibers, and preferably 1 to 10 micron microfibers. Further, by adding a polyethylene processing stabilizing component, meltblown webs can be produced which exhibit barrier properties comparable with and even superior to barrier properties associated with conventional polypropylene meltblown webs. In addition, the resultant polyethylene web has good integrity and increased strength.

The term "polyethylene processing stabilizing component" is used herein to refer to any of the types of agents or components, which, when blended with polyethylene, provide a polyethylene composition capable of being meltblown at high polymer throughputs, i.e., at least about 0.65 grams of polymer per capillary hole per minute ("g/h/m"), and up to about 1 g/h/m, and higher, without a corresponding increase in fiber size or denier, as determined by the resultant barrier properties of the meltblown web.

In this regard, the polyethylene meltblown webs of the invention exhibit superior barrier properties, as determined using standard hydrohead measurements. As the skilled artisan will appreciate, hydrohead measurements refer to the barrier protection of fabrics evaluated in terms of centimeters of water pressure which can be withstood by the fabric before compromising the barrier thereof.

Current industry standards require barrier fabrics to have a hydrohead of at least about 40 cm. The meltblown webs of the present invention exhibit a hydrohead measurement of at least about 40 centimeters ("cm") when produced at polymer throughputs approaching 1 g/h/m, and up to about 45 and 50 cm when produced at polymer throughputs of about 0.65 g/h/m.

The meltblown webs of the present invention are particularly advantageous because of the gamma radiation stability of the webs. Conventional polypropylene meltblown barrier fabrics can have good barrier properties, typically hydroheads of about 50 to about 55 cm. However, as discussed above, conventional grades of polypropylene are sensitive to degradation by gamma irradiation. Fabrics produced from such polymers tend to lose strength over time, becoming brittle as a result of the gamma irradiation. Indeed, as a result of the polymer degradation, the barrier properties of the fabric can be compromised, as evidenced by reduced hydrohead measurements from 50 to 55 cm to about 20 to 25 cm for polypropylene webs treated with gamma irradiation and thereafter stored. Also, the instability of the polymers to the irradiation results in the generation of distasteful odors in the product which are unacceptable to the consumer.

In contrast, polyethylene is stable to gamma irradiation and does not substantially degrade. As a result, the webs of the invention do not suffer a significant loss in barrier properties over time and do not generate distasteful odors.

For example, meltblown webs of the invention having an initial hydrohead of at least about 40 cm can be exposed to gamma irradiation and then stored for several days, without a substantial loss in hydrohead properties (i.e. no greater than about 5%). In contrast, gamma irradiated polypropylene webs typically rapidly degrade significantly, even to the point that the fabric actually loses its cohesiveness or falls apart.

In addition, the polyethylene webs have desirable aesthetics, as compared to polypropylene meltblown webs, i.e., the webs of the invention have improved softness, flexibility, and drapeability.

Numerous agents can be employed as the polyethylene processing stabilizing component of the polyethylene composition or blend. The polyethylene processing stabilizing agent is selected to provide a stiffening effect to the polyethylene resin at low additive amounts. The polyethylene processing stabilizing component is added to the polyethylene resin in an amount sufficient to provide the desired degree of processing stability, and preferably is the minor component of the polyethylene/polyethylene processing stabilizing agent composition. One advantage of the invention is that small amounts of the additive can be used, so as to preserve the desirable qualities of the polyethylene resin, while concurrently enhancing its spinnability. This is also advantageous for purposes of economies of manufacture by minimizing costs associated with the use of additional resin components.

In one embodiment of the invention, the polyethylene processing stabilizing agent is a polymer having a higher viscosity and/or a higher melt strength than the polyethylene resin component. Numerous polymers may serve as the polyethylene processing stabilizing agent, including, but not limited to, polyolefins, such as polypropylene, polymethyl pentene (TPX) copolymer, and ethylene-propylene copolymers; and polycondensate polymers such as, but not limited to, polyesters and polyamides. For the purposes of this embodiment of the invention, polyesters are preferred.

In this embodiment of the invention, preferably the polymer is added to the polyethylene in an amount ranging from about 1 to about 15 percent by weight based upon the weight of the polyethylene polymer, and preferably from about 5 to about 10 percent by weight. The polymer can be added to the blend in an amount greater than about 15 percent by weight, but the inventors have found that the degree of improvement in polyethylene processing achieved by amounts of polymer above this level is minimal, as evidenced by the barrier protection achieved at a particular polymer throughput rate.

As will be appreciated by those skilled in the art, polymers such as polyester are particularly advantageous in the manufacture of ply 12 because this polymer has very good stability to gamma irradiation. However, polyolefins, such as polypropylene, may be employed in the manufacture of ply 12 as the component of a polymeric blend, so long as the composition is rendered gamma irradiation stable.

Other additives conventionally used in the production of meltblown microfibers can also be incorporated in the polymer blend such as UV stabilizers, pigments, delusterants, lubricants, wetting agents, antistatic agents, nucleating agents, water and alcohol repellents, etc, in the conventional amounts, which are typically no more than about 10% by weight. Polymeric additives may also be used in conjunction with the blends which impart specific benefits to either processing and/or end use. For example, plastomers, compatibilizers, viscosity modifiers or diluents which affect phase domain size or crystallinity may be included.

The components of the polyethylene composition can be combined in manners utilized in conventional extrusion processes. For example, the components can be dry blended in any acceptable form prior to being directed into the extruder and heated in the barrel of an extruder to form a melt blend. In some cases, sufficient mixing of the components may be achieved in the extruder as the components are converted to the molten state, although it may be preferable to use an additional mixing zone or step.

Advantageously, meltblown web 12 is electrically treated to improve filtration properties of the web. Such electrically treated fibers are known generally in the art as "electret" fibrous webs. Electret fibrous filters are highly efficient in filtering air because of the combination of mechanical entrapment of particles in the air with the trapping of particles based on the electrical or electrostatic characteristics of the fibers. Both charged and uncharged particles in the air, of a size that would not be mechanically trapped by the filtration medium, will be trapped by the charged nature of the filtration medium. Meltblown web 12 can be electrically treated using techniques and apparatus know in the art.

Outer ply 14 of the composite fabric 10 is a nonwoven web of spunbonded substantially continuous thermoplastic filaments. The spunbonded web 14 may be produced using well known spunbonding processes, and may suitably have a basis weight in the range of about 10 to about 100 gsm. The thermoplastic filaments of ply 14 can be made of any of a number of known fiber forming polymer compositions. Such polymers include those selected from the group consisting of polyolefins such as polypropylene and polyethylene, polyesters, polyamides, and copolymers and blends thereof. Preferably, the polymer is a gamma irradiation stable polymer or polymer composition, such as polyester or polyamide, but polymers such as polypropylene can also be used so long as steps are taken to impart gamma irradiation stability thereto.

Outer ply 16 may be either a web of spunbonded substantially continuous thermoplastic filaments or a web of staple fibers. In the embodiment illustrated, ply 16 is a nonwoven web of spunbonded substantially continuous thermoplastic filaments of a composition and basis weight similar to outer ply 14. The continuous filaments or staple fibers of outer ply 16 may be selected from the same polymers as described above for ply 14. Additionally, the staple fibers may be natural or synthetic fibers having hydrophilic properties to give one surface of the composite fabric absorbent characteristics. Examples of hydrophilic fibers include cotton fibers, wool fibers, rayon fibers, acrylic fibers, and fibers formed of normally hydrophobic polymers which have been treated or chemically modified to render them hydrophilic. When ply 16 is a nonwoven web of staple fibers, the nonwoven web can be a carded web or a wet-laid web of staple fibers.

Layers 12, 14 and 16 of the laminate fabric of the present invention can be bonded together to form a coherent fabric using techniques and apparatus known in the art. For example, layers 12, 14 and 16 can be bonded together by thermal bonding, mechanical interlocking, adhesive bonding, and the like. Preferably, laminate fabric 10 includes a multiplicity of discrete thermal bonds distributed throughout the fabric, bonding layers 12, 14 and 16 together to form a coherent fabric.

In addition, as will be appreciated by the skilled artisan, laminate fabric 10 can include one or more additional layers to provide improved barriers to transmission of liquids, airborne contaminants, etc., or additional supporting layers.

Meltblown web 12 of the invention exhibits a variety of desirable characteristics, which make the web particularly useful as a barrier component in a laminate fabric, such as a sterile wrap. The microfibers of meltblown web 12 are formed of a gamma irradiation stable polymer composition so that the fabric does not substantially degrade upon treatment with gamma radiation. This can prevent a significant loss of barrier properties over time, as can result with the use of polypropylene barrier fabrics. Further, the fabrics do not suffer from objectional odors, as can result with polypropylene fabrics treated with gamma radiation.

In addition, because the majority component of the microfibers is polyethylene, which is a relatively soft and elongatable polymer, the resultant fabric can exhibit significantly improved aesthetic properties such as a soft hand or feel, improved drape and flexibility, as compared to currently available commercial products.

Figure 2:
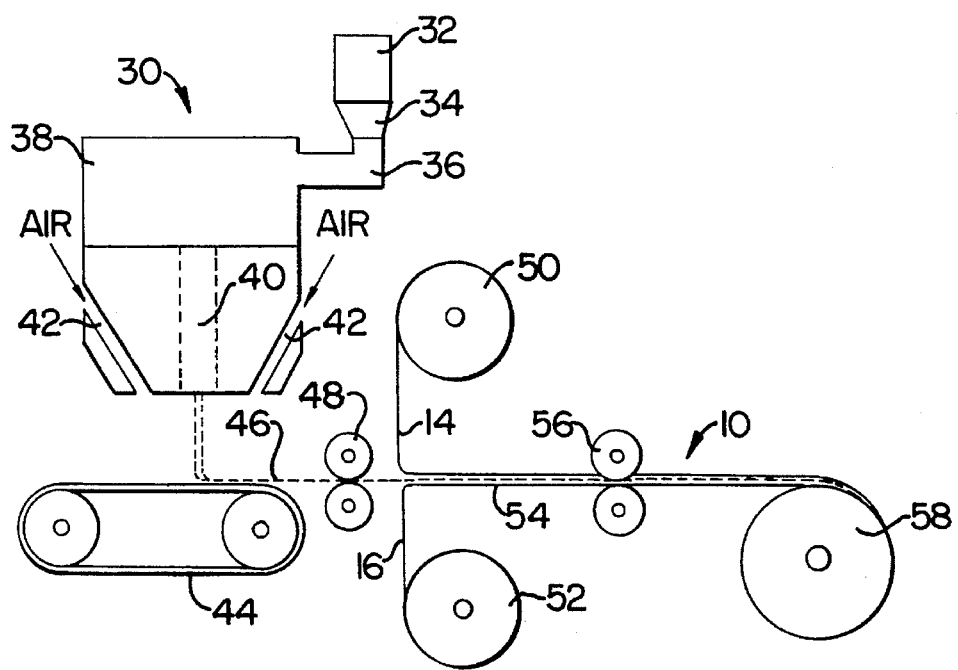
FIG. 2 is a schematic side view of an illustrative process in accordance with the present invention for forming the fabrics of the invention.

Referring now to FIG. 2, an illustrative process for forming the meltblown web 12 and the laminate fabric 10 of the present invention is illustrated. FIG. 2 includes a simplified, diagrammatic illustration of an apparatus, designated generally as 30, capable of carrying out the process of forming a meltblown web in accordance with the invention. Conventional meltblowing apparatus known in the art can be used.

In meltblowing, thermoplastic resin is fed into an extruder where it is melted and heated to the appropriate temperature required for fiber formation. The extruder feeds the molten resin to a special meltblowing die. The die arrangement is generally a plurality of linearly arranged small diameter capillaries. The resin emerges from the die orifices as molten threads or streams into high velocity converging streams of heated gas, usually air. The air attenuates the polymer streams and breaks the attenuated streams into a blast of fine fibers which are collected on a moving screen placed in front of the blast. As the fibers land on the screen, they entangle to form a cohesive web.

The technique of meltblowing is known in the art and is discussed in various patents, e.g., Buntin et al, U.S. Pat. No. 3,978,185; Buntin, U.S. Pat. No. 3,972,759; and McAmish et al, U.S. Pat. No. 4,622,259.

In the present invention, process parameters of the meltblowing process are selected and controlled to form the microfine microfibers of the meltblown webs of the invention while minimizing or eliminating processing complications which can result form processing polyethylene resins. These complications include, for example, low polymer throughputs, excessive elongation and breakage of the polymer filaments, particularly at high polymer throughputs, formation of polymer globules in the web, high denier fibers, lack of structural integrity of the meltblown web, all of which can interfere with processing efficiency and cause defects in the meltblown web. In addition, the blend components which impart particular desired processing properties and end product characteristics can also further minimize or eliminate these and other undesirable processing conditions.

It has been found that relatively high MFR polyethylene polymers, i.e., at least about 125 MFR, and preferably at least about 150 MFR or higher, can be attenuated in a heated high velocity air stream in such a way suitable for the stable production of microfine polyethylene microfibers and concurrent formation of a microfibrous nonwoven web. Further, the conditions can be controlled to achieve high polymer throughputs at commercially feasible rates, i.e., least about 0.65 g/h/m, and higher, without compromising the resultant fiber size and barrier properties of the webs. Specifically, these conditions include controlling polymer melt temperature, as well as selecting an appropriate MFR polymer, to promote formation of microfine polyethylene microfibers and high barrier webs at commercial throughputs without significantly impairing or adversely impacting the process conditions.

The inventors have found that increasing the melt temperature of the blend can result in improved processability of the polyethylene component. Polyethylene resins are typically heated to a temperature of about 510° F. to about 520° F. (about 265° C.) to about 270° C.) in conventional melt-spinning operations for fiber formation. In the present invention, advantageously the melt temperature of the blend is increased at least about 10%, relative to conventional processing parameters for polyethylene systems, i.e., to at least about 580° F. (300° C.). This can be particularly advantageous as described in more detail below when the blend includes a polymer having a melt temperature and/or viscosity higher than the majority polyethylene component.

When the polyethylene processing stabilizing agent is a polymer additive having a higher melt temperature and/or higher viscosity as compared to the polyethylene resin, preferably the melt temperature of the polyethylene composition is selected to melt the polyethylene resin and also to melt and degrade the other polymer component sufficiently so that a flowable melt blend is formed. The degree and uniformity of mixing of the components can also be optimized by increasing the melt temperature of the composition.

For example, when polyester is the polyethylene processing stabilizing agent, it is preferred to increase the melt temperature of the polyethylene composition to a temperature approaching the melt temperature of the polyester component, i.e., to at least about 580° F. The temperature selected is sufficiently high to thermally soften and degrade the polyester additive and to obtain optimum mixing of the polyethylene and the minor polyester component of the blend. Further, as noted above, it is also believed that increasing the melt temperature of the blend improves the processability of the polyethylene component. Accordingly, the increase in melt temperature is adjusted in accordance with the characteristics of the blend system being processed.

Accordingly, as will be appreciated by the skilled artisan, the melt temperature of the blend can be dependent upon a variety of factors, such as, for example, the specific polyethylene processing stabilizing agent used, the melting point and/or viscosity of the agent, the melt flow rate of the polyethylene majority component, and the like.

It is noted that the as the melt flow rate (MFR) of the polyethylene increases, for example to levels above 150, and greater, the melt temperature of the blend does not necessarily have to increase as much as with polymers having a melt flow rates at or below this range to achieve the same end product. This does not, however, necessarily preclude the use of higher melt temperatures, particularly when the polyethylene processing stabilizing agent has a higher melt temperature.

Referring again to FIG. 2, as shown, the polyethylene polymer and the polyethylene processing stabilizing agent are placed in a feed hopper 32 of a screw extruder 34 where they are heated to a temperature sufficient to melt the polymer. Advantageously, the polyethylene polymer has a MFR of at least 125. Alternatively, as will be appreciated by the skilled artisan, polyethylene polymers having a MFR of less than 125 can be used in combination with a visbreaking agent, such as a peroxide, which degrades the polymer and reduces the melt flow rate thereof to form a polymer which exiting the extruder has a MFR of at least 125. Visbreaking agents and techniques are known in the art.

The molten polymer composition is forced by the screw through conduit 36 into a spinning block 38 and the polymer composition is extruded from the spin block 38 through a plurality of small diameter capillaries 40 into a high velocity gas stream, such as compressed air designated generally as 42. The temperature and velocity of the air is controlled as described above to form microfine meltblown microfibers having an average fiber diameter between about 1 and 50 microns, preferably between 1 and 10 microns.

The meltblown microfibers are deposited onto a foraminous endless belt 44 and form a coherent web 46 which is removed from the belt by a pair of consolidation rolls 48. The rolls optionally may include bonding elements (not shown) in the form of a relief pattern to provide a desired extent of point bonding of the microfibrous web. At these points where heat and pressure is applied, the fibers fuse together, resulting in strengthening of the web structure.

The microfibrous web 46 can then be electrically treated to impart an electrical charge to the fabric, and thus improve its filtration capabilities. Techniques and apparatus for electrically treating a nonwoven web are known in the art.

The microfibrous web can be removed from the assembly and stored on a roll. Alternatively, as illustrated, the microfibrous web can be passed on to additional manufacturing processes, as described in more detail below.

As illustrated in FIG. 2, the microfibrous web 46 can be fed through consolidation rolls 48 and is combined with a pre-formed web 14 and preformed web 16, drawn from supply rolls 50 and 52, respectively, to form a laminate 54.

As described above, at least one of preformed webs 14 and 16 can be spunbonded webs of continuous filaments. The spunbonding process involves extruding a polymer through a generally linear die head or spinneret for melt spinning substantially continuous filaments. The spinneret preferably produces the filaments in substantially equally spaced arrays and the die orifices are preferably from about 0.002 to about 0.040 inches in diameter.

The substantially continuous filaments are extruded from the spinneret and quenched by a supply of cooling air. The filaments are directed to an attenuator after they are quenched, and a supply of attenuation air is admitted therein. Although separate quench and attenuation zones can be used, it will be apparent to the skilled artisan that the filaments can exit the spinneret directly into the attenuator where the filaments can be quenched, either by the supply of attenuation air or by a separate supply of quench air.

The attenuation air may be directed into the attenuator by an air supply above the entrance end, by a vacuum located below a forming wire or by the use of eductors integrally formed in the attenuator. The air proceeds down the attenuator, which narrows in width in the direction away from the spinneret, creating a venturi effect and causing filament attenuation. The air and filaments exit the attenuator, and the filaments are collected on the collection screen. The attenuator used in the spunbonding process may be of any suitable type known in the art, such as a slot draw apparatus or a tube-type (Lurgi) apparatus.

Alternatively, at least one of webs 14 and 16 can be a carded web formed of staple length textile fibers, or a wet-laid or air-laid web of staple fibers, including bicomponent staple length textile fibers. While pre-formed webs 14 and 16 are shown, it will be appreciated that the webs could be formed in a continuous in-line process and combined with meltblown web 46. It will also be understood that additional webs could be combined with meltblown web 46, on one or both sides thereof.

The three-layer laminate 54 is conveyed longitudinally as shown in FIG. 2 to a conventional thermal fusion station 56 to provide a composite bonded nonwoven fabric 10. The fusion station is constructed in a conventional manner as known to the skilled artisan, and advantageously includes bonding rolls. Preferably, the layers are bonded to provide a multiplicity of thermal bonds distributed throughout the laminate fabric. Because of the wide variety of polymers which can be used in the fabrics of the invention, bonding conditions, including the temperature and pressure of the bonding rolls, vary according to the particular polymers used, and are known in the art for differing polymers.

Although a thermal fusion station in the form of bonding rolls is illustrated in FIG. 2, other thermal treating stations such as ultrasonic, microwave or other RF treatment zones which are capable of bonding the fabric can be substituted for the bonding rolls of FIG. 2. Such conventional heating stations are known to those skilled in the art and are capable of effecting substantial thermal fusion of the nonwoven webs. In addition other bonding techniques known in the art can be used, such as by hydroentanglement of the fibers, needling, and the like. It is also possible to achieve bonding through the use of an appropriate bonding agent as known in the art.

The resultant fabric 10 exits the thermal fusion station and is wound up by conventional means on a roll 58.

The present invention is subject to numerous variations. For example, the polymers used in the present invention may be specifically engineered to provide or improve a desired property in the composite. For example, any one of a variety of adhesion-promoting, or "tackifying," agents such as ethylene, vinyl acetate copolymers, may be added to the polymers used in the production of any of the webs of the composite structure, to improve inter-ply adhesion. Further, at least one of the outer webs may be treated with a treatment agent to render any one of a number of desired properties to the fabric, such as flame retardancy, hydrophilic properties, and the like.

Additionally, the fibers or filaments used in any of the webs of the composite structure may comprise a polymer blend or bicomponent polymeric structure. For example, in one embodiment of the invention, fibers employed in the carded web can be sheath/core or similar bicomponent fibers wherein at least one component of the fiber is polyethylene. The bicomponent fibers can provide improved aesthetics such as hand and softness based on the surface component of the bicomponent fibers, while providing improved strength, tear resistance and the like due to the stronger core component of the fiber. Preferred bicomponent fibers include polyolefin/polyester sheath/core fibers such as a polyethylene/polyethylene terephthalate sheath core fiber.

Additionally, although the process illustrated in FIG. 2 employs a meltblown web sandwiched between two spunbonded webs, it will be apparent that different numbers and arrangements of webs can be employed in the invention. For example, the composite nonwoven fabric of the invention may comprise a spunbonded/meltblown web composite. Alternatively, the meltblown web can be sandwiched between a spunbonded web and a carded web. Additionally, several meltblown layers can be employed in the invention and/or greater numbers of other fibrous webs can be used. Nonwoven webs other than carded webs are also advantageously employed in the nonwoven fabrics of the invention. Nonwoven staple webs can be formed by air laying, garnetting, and similar processes known in the art.

The present invention will be further illustrated by the following non-limiting examples.

EXAMPLE 1

Meltblown webs were formed by meltblowing a composition comprising a polyethylene resin having a melt flow rate of 150 g/min. available from Dow Chemical Company under the trade designation ASPUN 6831A, with varying amounts (0%, 5%, 10% and 15% by weight based on the weight of the polyethylene) of a polyethylene processing stabilizing agent, specifically polyester available from Hoechst-Celanese Corporation under the trade designation 2000A (a polybutylene terephthalate, "PBT"). The composition was meltblown at varying polymer throughputs (0.65, 0.8, 0.9 and 1 grams per hole per minute or "g/h/m"). Hydrohead in centimeters was measured for each web. Specific processing parameters and hydrohead measurements of the webs including polyester are set forth below in Table 1; processing parameters and hydrohead measurements of 100% polyethylene webs are set forth below in Table 2.

TABLE 1

PROCESSING CONDITIONS AND BARRIER PROPERTIES FOR MELTBLOWN POLYETHYLENE WEBS WITH VARYING PERCENTAGES OF POLYESTER

| SAMPLE[1] | % PBT[2] | MELT TEMP, °F. | AIR TEMP, °F. | SCFM | DCD | POLYMER THROUGHPUT, G/H/M | BASIS WEIGHT, GSM | HYDRO-HEAD (CM)[3] | STD. DEV. | SET BACK | AIR GAP | TABLE VAC. |
|---|---|---|---|---|---|---|---|---|---|---|---|---|
| 1A | 5 | 580 | 410 | 550 | 5 | 0.65 | 27 | 41.85 | 2.85 | 0.060 | 0.080 | 10.2 MPS |
| 2A | 10 | 580 | 410 | 600 | 5 | 0.65 | 27 | 49.75 | 0.89 | 0.060 | 0.080 | 10.2 MPS |
| 2XX | 10 | 580 | 385 | 600 | 5 | 0.65 | 27 | 50.2 | 1.5 | 0.060 | 0.080 | 10.2 MPS |
| 3A | 15 | 580 | 410 | 600 | 5 | 0.65 | 27 | 48.95 | 0.64 | 0.060 | 0.080 | 10.2 MPS |
| 4A | 5 | 580 | 410 | 600 | 5 | 0.8 | 27 | 47.25 | 1.55 | 0.060 | 0.080 | 10.2 MPS |
| 5A | 10 | 580 | 410 | 600 | 5 | 0.8 | 27 | 49.85 | 1.39 | 0.060 | 0.080 | 10.2 MPS |
| 6A | 15 | 580 | 410 | 600 | 5 | 0.8 | 27 | 49.45 | 1.61 | 0.060 | 0.080 | 10.2 MPS |
| 7A | 15 | 580 | 410 | 600 | 5 | 0.8 | 23 | 46.8 | 2.12 | 0.060 | 0.080 | 10.2 MPS |
| 8A | 10 | 580 | 410 | 600 | 5 | 0.8 | 23 | 45.9 | 2.24 | 0.060 | 0.080 | 10.2 MPS |
| 9A | 5 | 580 | 410 | 600 | 5 | 0.8 | 23 | 44.5 | 1.25 | 0.060 | 0.080 | 10.2 MPS |
| 10A | 5 | 580 | 410 | 600 | 5 | 0.9 | 23 | 36.5 | 2.07 | 0.060 | 0.080 | 10.2 MPS |
| 11A | 5 | 580 | 410 | 600 | 5 | 0.9 | 27 | 43.8 | 2.04 | 0.060 | 0.080 | 10.2 MPS |
| 12A | 10 | 580 | 410 | 600 | 5 | 0.9 | 23 | 42.4 | 1.58 | 0.060 | 0.080 | 10.2 MPS |
| 13A | 10 | 580 | 410 | 600 | 5 | 0.9 | 27 | 43.35 | 1.56 | 0.060 | 0.080 | 10.2 MPS |
| 14A | 15 | 580 | 410 | 600 | 5 | 0.9 | 23 | 43.7 | 1.87 | 0.060 | 0.080 | 10.2 MPS |
| 15A | 15 | 580 | 410 | 600 | 5 | 0.9 | 27 | 44.05 | 1.5 | 0.060 | 0.080 | 10.2 MPS |
| 16A | N/A | 580 | 410 | 600 | 5 | N/A | N/A | N/A | | 0.060 | 0.080 | 10.2 MPS |
| 17A | 5 | 580 | 410 | 600 | 5 | 1 | 27 | 37.05 | 4.28 | 0.060 | 0.080 | 10.2 MPS |
| 18A | N/A | 580 | 410 | 600 | 5 | N/A | N/A | N/A | | 0.060 | 0.080 | 10.2 MPS |
| 19A | 10 | 580 | 410 | 600 | 5 | 1 | 27 | 40.85 | 1.68 | 0.060 | 0.080 | 10.2 MPS |
| 20A | N/A | 580 | 410 | 600 | 5 | N/A | N/A | N/A | | 0.060 | 0.080 | 10.2 MPS |
| 21A | 15 | 580 | 410 | 600 | 5 | 1 | 27 | 41.15 | 2.32 | 0.060 | 0.080 | 10.2 MPS |

[1]Polyethylene is LLDPE 5831A from Dow Chemical.
[2]PBT is polybutylene terephthalate, 2000A, from Hoechst Colanese Corporation.
[3]Hydrohead measurement is the average of 10 samples.

TABLE 2

COMPARATIVE MELTBLOWING DATA FOR 100% POLYETHYLENE WEBS

| SAMPLE[1] | MELT TEMP, °F. | AIR TEMP, °F. | SCFM | DCD | POLYMER THROUGHPUT, G/H/M | BASIS WEIGHT, GSM | HYDRO-HEAD(CM)[2]/ STD. DEV. | SET BACK | AIR GAP | TABLE VAC. |
|---|---|---|---|---|---|---|---|---|---|---|
| MATERIAL PRODUCED AT .65 G/H/M ||||||||||| |
| 7 | 578 | 396 | 550 | 5 | 0.65 | 27 GSM | 44.8/2.3 | 0.060 | 0.080 | 9.4 MPS |
| 15 | 577 | 350 | 600 | 5 | 0.65 | 27 GSM | 46.1/2.02 | 0.060 | 0.080 | 9.4 MPS |
| MATERIAL PRODUCED AT .7 G/H/M ||||||||||| |
| 6 | 580 | 420 | 450 | 5 | 0.70 | 20 GSM | 34.4/1.71 | 0.060 | 0.080 | 8.2 MPS |
| MATERIAL PRODUCED AT .8 G/H/M ||||||||||| |
| 1 | 580 | 450 | 550 | 5 | 0.80 | 27 GSM | 33.05/2.08 | 0.060 | 0.080 | 8.2 MPS |
| 10 | 577 | 395 | 550 | 5 | 0.80 | 27 GSM | 39.2/2.66 | 0.060 | 0.080 | 9.4 MPS |
| 14 | 577 | 350 | 600 | 5 | 0.80 | 27 GSM | 42.6/1.84 | 0.060 | 0.080 | 9.4 MPS |
| MATERIAL PRODUCED AT .9 G/H/M ||||||||||| |
| 2 | 580 | 430 | 550 | 5 | 0.90 | 27 GSM | 36.05/2.2 | 0.060 | 0.080 | 8.2 MPS |
| 8 | 577 | 350 | 600 | 5 | 0.90 | 27 GSM | 37.3/4.9 | 0.060 | 0.080 | 9.4 MPS |
| 12 | 577 | 397 | 550 | 5 | 0.90 | 27 GSM | 38./2 | 0.060 | 0.080 | 9.4 MPS |

TABLE 2-continued

COMPARATIVE MELTBLOWING DATA FOR 100% POLYETHYLENE WEBS

| SAM-PLE[1] | MELT TEMP, °F. | AIR TEMP, °F. | SCFM | DCD | POLYMER THROUGHPUT, G/H/M | BASIS WEIGHT, GSM | HYDRO-HEAD(CM)[2]/ STD. DEV. | SET BACK | AIR GAP | TABLE VAC. |
|---|---|---|---|---|---|---|---|---|---|---|
| | | | | | MATERIAL PRODUCED AT 1. G/H/M | | | | | |
| 3 | 590 | 410 | 550 | 5 | 1.00 | 27 GSM | 36/1.33 | 0.060 | 0.080 | 8.2 MPS |
| 4 | 590 | 421 | 450 | 5 | 1.00 | 18 GSM | 29.25/4.29 | 0.060 | 0.080 | 10.2 MPS |
| 5 | 590 | 421 | 450 | 5 | 1.00 | 30 GSM | 31.93/3.37 | 0.060 | 0.080 | 10.2 MPS |
| 9 | 577 | 350 | 600 | 5 | 1.00 | 27 GSM | 36/1.94 | 0.060 | 0.080 | 9.4 MPS |
| 11 | 577 | 397 | 550 | 5 | 1.00 | 27 GSM | 35.2/1.23 | 0.060 | 0.080 | 9.4 MPS |
| 13 | 577 | 395 | 600 | 5 | 1.00 | 27 GSM | 38.5/1.7 | 0.060 | 0.080 | 9.4 MPS |

[1]Polyethylene is LLDPE 6831A from Dow Chemical.
[2]Hydrohead measurement is the average of 10 samples.

Hydrohead is a measurement of the ability of a fabric to withstand water pressure applied to one surface of the fabric before breaching or impairing the barrier properties thereof. The barrier protection, or hydrohead, of the meltblown fabrics was evaluated in terms of centimeters of water pressure which can be withstood by the fabric before compromising the barrier thereof. A sheet of the fabric of the invention can exhibit hydro head measurements of up to about 50 cm at commercially feasible polymer throughputs of about 0.65 g/h/m, and up to about 40 cm at even higher throughputs up to about 1 g/h/m. For purposes of comparison, 100% polyethylene meltblown fabrics were also prepared and hydrohead measured. It is apparent from the data set forth in Tables 1 and 2 that as polymer throughput increases, the addition of a polyethylene processing stabilizing agent provides improved web barrier properties. In addition, as throughputs increase, the addition of the polyethylene processing stabilizing agent improved polyethylene processing, i.e., decreased shot, increased integrity, etc.

EXAMPLE 2

Trilaminate fabrics including outer spunbonded polyester and polyamide webs thermally bonded to samples of the meltblown webs as prepared above in Example 1 are prepared. The laminate fabrics are thermally bonded. The fabrics exhibit good barrier properties. Further, the laminate fabrics of the invention exhibit high flexibility (i.e., ease of handling) and superior softness.

The foregoing examples are illustrative of the present invention, and are not to be construed as limiting thereof. The invention is defined by the following claims, with equivalents of the claims to be included therein.

That which is claimed:

1. A meltblown web which is particularly useful as a barrier layer in a composite laminate fabric, said meltblown web comprising a plurality of thermoplastic microfine meltblown fibers formed of a composition comprising polyethylene as a dominant portion thereof and at least one polyethylene processing stabilizing component as a minor portion thereof.

2. The meltblown web according to claim 1 wherein said at least one polyethylene processing stabilizing component is present in the composition in an amount sufficient to provide substantially stable polyethylene meltblowing processing at polymer throughputs of at least about 0.65 grams/hole/minute.

3. The meltblown web according to claim 2 wherein said at least one polyethylene processing stabilizing component is present in the composition in an amount sufficient to provide substantially stable polyethylene meltblowing processing at polymer throughputs of at least about 1 gram/hole/minute.

4. The meltblown web according to claim 1, wherein said microfine fibers comprise linear low density polyethylene.

5. The meltblown web according to claim 1, wherein said microfine fibers comprise a polyethylene polymer having a melt flow rate of at least about 125.

6. The meltblown web according to claim 5, wherein said microfine fibers comprise a polyethylene polymer having a melt flow rate of at least about 150.

7. The meltblown web according to claim 1 wherein said meltblown web exhibits an increase in barrier properties of at least about 5% as compared to 100% polyethylene meltblown webs produced at substantially the same polymer throughput rate.

8. The meltblown web according to claim 7 wherein said meltblown web exhibits an increase in barrier properties of at least about 10% as compared to 100% polyethylene meltblown webs produced at substantially the same polymer throughput rate.

9. The meltblown web according to claim 1 wherein said meltblown web exhibits a hydrohead of at least about 40 centimeters.

10. The meltblown web according to claim 1 wherein said meltblown web exhibits a hydrohead of at least about 45 centimeters.

11. The meltblown web according to claim 1 wherein said at least one polyethylene processing stabilizing component comprises a polymer resin selected from the group consisting of polyolefins, polyesters and polyamides.

12. The meltblown web according to claim 11, wherein said polymer resin is present in said composition in an amount between about 1 and 15 percent by weight based on the weight of the polyethylene.

13. A meltblown web which is particularly useful as a barrier layer in a composite laminate fabric, said meltblown web comprising a plurality of thermoplastic microfine meltblown fibers formed of a gamma irradiation stable polymer composition comprising polyethylene as a dominant portion thereof and at least one gamma irradiation stable, polyethylene processing stabilizing polymeric component as a minor portion thereof present in the composition in an amount sufficient to provide substantially stable polyethylene meltblowing processing at high polymer throughputs.

14. The meltblown web according to claim 13, wherein said at least one gamma irradiation stable, polyethylene processing stabilizing polymeric component is polyester present in said composition in an amount between about 1 and 15 percent by weight based on the weight of polyethylene.

15. A meltblown web which is particularly useful as a barrier layer in a composite laminate fabric, said meltblown web comprising a plurality of thermoplastic microfine meltblown fibers formed of a composition comprising linear low density polyethylene having a melt flow rate of at least about 125 as a dominant portion thereof and at least one polyethylene processing stabilizing component as a minor portion thereof present in the composition in an amount sufficient to provide substantially stable polyethylene meltblowing processing at polymer throughputs of at least about 0.65 grams/hole/minute, said polyethylene processing stabilizing component comprising polyester present in said composition in an amount between about 1 and 12 percent by weight of the composition based on the weight of polyethylene.

16. A nonwoven laminate fabric, comprising:
   first and second nonwoven webs; and
   a nonwoven web of meltblown microfibers sandwiched between and bonded to said first and second nonwoven webs to form a composite nonwoven fabric, said meltblown web comprising a plurality of thermoplastic microfine meltblown fibers formed of a composition comprising polyethylene as a dominant portion thereof and at least one polyethylene processing stabilizing component as a minor portion thereof present in the composition in an amount sufficient to provide substantially stable polyethylene meltblowing processing at polymer throughputs of at least about 0.65 grams/hole/minute.

17. The laminate fabric according to claim 16 wherein said first and second nonwoven webs are spunbonded webs comprising substantially continuous filaments formed of a gamma irradiation stable polymer composition.

18. A process for manufacturing a meltblown barrier layer, comprising:
   heating a polymer composition comprising polyethylene as a dominant portion thereof and at least one polyethylene processing stabilizing component as a minor portion thereof present in the composition in an amount sufficient to provide substantially stable polyethylene meltblowing processing at high polymer throughput rates;
   extruding said molten polymer composition through capillaries to form filamentary streams;
   attenuating and breaking said filamentary streams with a high velocity heated gas to form a plurality of microfine fibers; and
   collecting said microfine fibers on a collection surface to form a nonwoven web.

19. The process according to claim 18, wherein the step of extruding said molten polymer composition comprises extruding said polymer composition at a polymer throughput rate of at least about 0.65 grams/hole/minute.

20. The process according to claim 19, wherein the step of extruding said molten polymer composition comprises extruding said polymer composition at a polymer throughput rate of at least about 1 gram/hole/minute.

21. The process according to claim 18, wherein said at least one polyethylene processing stabilizing component is a polymeric component having a higher melt temperature than said polyethylene, and wherein said heating step comprises heating said polymer composition to a temperature sufficient to substantially thermally degrade and melt said higher melting polymeric component to form a flowable polymer composition.

22. The process according to claim 21, wherein said at least one polyethylene processing stabilizing component is polyester, and wherein said heating step comprises heating said polymer composition to a temperature of about 580° F.

23. A process for manufacturing a meltblown barrier layer, comprising:
   heating a polymer composition comprising linear low density polyethylene having a melt flow rate of at least about 125 as a dominant portion thereof and at least one polyethylene processing stabilizing component as a minor portion thereof present in the composition in an amount sufficient to provide substantially stable polyethylene meltblowing processing at high polymer throughput rates, said polyethylene processing stabilizing component comprising polyester present in said composition in an amount between about 1 and 12 percent by weight of the composition based on the weight of polyethylene;
   extruding said molten polymer composition through capillaries to form filamentary streams at a polymer throughput rate of at least about 0.65 grams per hole per minute;
   attenuating and breaking said filamentary streams with a high velocity heated gas to form a plurality of microfine fibers; and
   collecting said microfine fibers on a collection surface to form a nonwoven web.

24. A process for the manufacture of a nonwoven laminate fabric, the process comprising:
   forming a meltblown web comprising a plurality of thermoplastic microfine meltblown fibers formed of a composition comprising polyethylene as a dominant portion thereof and at least one polyethylene processing stabilizing component as a minor portion thereof present in the composition in an amount sufficient to provide substantially stable polyethylene meltblowing processing at polymer throughputs of at least about 0.65 grams/hole/minute;
   sandwiching said meltblown nonwoven web between opposing nonwoven webs formed of spunbonded substantially continuous filaments to form a laminate fabric; and
   bonding said opposing nonwoven webs and said meltblown web together to form a coherent laminate fabric.

* * * * *

UNITED STATES PATENT AND TRADEMARK OFFICE
CERTIFICATE OF CORRECTION

PATENT NO.   :   5,616,408
DATED        :   April 1, 1997
INVENTOR(S)  :   Oleszczuk et al.

It is certified that error appears in the above-identified patent and that said Letters Patent is hereby corrected as shown below:

Columns 13-14, Table 1, footnote 1, "5831A" should be -- 6831A --.

Columns 13-14, Table 1, footnote 2, "Colanese" should be -- Celanese --.

Columns 15-16, Table 2, 8th column, line 3, "31.93" should be -- 31.83 --.

Signed and Sealed this

Seventeenth Day of June, 1997

Attest:

BRUCE LEHMAN

*Attesting Officer*     *Commissioner of Patents and Trademarks*